(12) United States Patent
Kim et al.

(10) Patent No.: US 9,256,236 B2
(45) Date of Patent: Feb. 9, 2016

(54) AREA-EFFICIENT FREQUENCY COMPENSATION

(71) Applicants: Sejun Kim, Westford, MA (US); Khiem Quang Nguyen, Tewksbury, MA (US)

(72) Inventors: Sejun Kim, Westford, MA (US); Khiem Quang Nguyen, Tewksbury, MA (US)

(73) Assignee: ANALOG DEVICES, INC., Norwood, MA (US)

( * ) Notice: Subject to any disclaimer, the term of this patent is extended or adjusted under 35 U.S.C. 154(b) by 222 days.

(21) Appl. No.: 13/952,118

(22) Filed: Jul. 26, 2013

(65) Prior Publication Data

US 2015/0028835 A1     Jan. 29, 2015

(51) Int. Cl.
*H02M 3/156* (2006.01)
*G05F 1/56* (2006.01)
*G06G 7/184* (2006.01)
*H02M 3/335* (2006.01)
*H02M 1/00* (2007.01)

(52) U.S. Cl.
CPC *G05F 1/56* (2013.01); *G06G 7/184* (2013.01); *H02M 3/156* (2013.01); *H02M 3/33507* (2013.01); *H02M 2001/0003* (2013.01)

(58) Field of Classification Search
CPC ...................................................... H02M 3/156
USPC ................................................... 323/282, 285
See application file for complete search history.

(56) References Cited

U.S. PATENT DOCUMENTS

| | | | | |
|---|---|---|---|---|
| 5,754,414 A | * | 5/1998 | Hanington | ................. 363/21.12 |
| 2007/0273414 A1 | * | 11/2007 | Jung et al. | ..................... 327/113 |
| 2015/0028835 A1 | * | 1/2015 | Kim et al. | ..................... 323/280 |

OTHER PUBLICATIONS

Ahmad, H.H., et.al., 'A 300mA 14mV-ripple digitally controlled buck converter using frequency domain delta sigma ADC and hybrid PWM generator', ISSCCDig.Tech. Papers, pp. 202-203, Feb. 2010.
Kuttner, F., et.al., 'A digitally controlled DC-DC converter for SoC in 28nm CMOS', ISSCC Dig. Tech.Papers, pp. 387-385, Feb. 2011.
P.Y. Wu, et.al., 'Area- and power-efficient monolithic buck converters with pseudo-type III compensation', IEEEJ. Solid-State Circuits, vol. 45, No. 8, pp. 1446-1455, Aug. 2010.

* cited by examiner

*Primary Examiner* — Jeffrey Sterrett
(74) *Attorney, Agent, or Firm* — Kenyon & Kenyon LLP

(57) ABSTRACT

A DC-to-DC converter includes an error integrator that further includes a first amplifier and a second amplifier that each includes a first input for receiving a reference voltage and a second input for receiving a feedback voltage, a capacitor to an output of the second amplifier, and a resistor including a first end being coupled to an output of the first amplifier and a second end being coupled to the capacitor.

18 Claims, 4 Drawing Sheets

AREA-EFFICIENT FREQUENCY COMPENSATION

FIELD OF THE INVENTION

The present disclosure is generally directed to frequency compensation, in particular, to area-efficient frequency compensation for DC-to-DC converters.

BACKGROUND INFORMATION

Transfer functions of multiple-stage amplification circuits may include poles within the frequency bandwidth of the amplification circuits. A type-I amplification circuit may have one pole within its frequency bandwidth; a type-II amplification circuit may have two poles within its frequency bandwidth; and a type-III amplification circuit may have three poles within its frequency bandwidth. When two or more poles exist within the bandwidth of an amplification circuit, the outputs of the amplification are inherently unstable. For example, switching power converters commonly include three poles within its frequency bandwidth, thereby rendering the switching power converters unstable if the switching power converters are not stabilized with stabilization measures.

One stabilization measure is frequency compensation which utilizes a loop filter such as a resistor and capacitor pair (RC) at the output of an amplifier. The loop filter essentially introduces a zero on the left-half-plane (LHP) to counter the influence of one pole, thus stabilizing the amplification circuit. As discussed further in the subsequent sections, the capacitance of the capacitor is commonly very large. A large capacitor means that the size of the capacitor is bulk. Typically, the required capacitance exceeds the upper limit that integrated capacitors (capacitors that can be fabricated on the integrated circuit chip) can provide. Therefore, external capacitors—or discrete capacitors—are used rather than integrated capacitors to minimize the area of the integrated circuit. These external capacitors complicate the circuit fabrication process.

DETAILED DESCRIPTION OF EXAMPLE EMBODIMENTS

Figure 1:
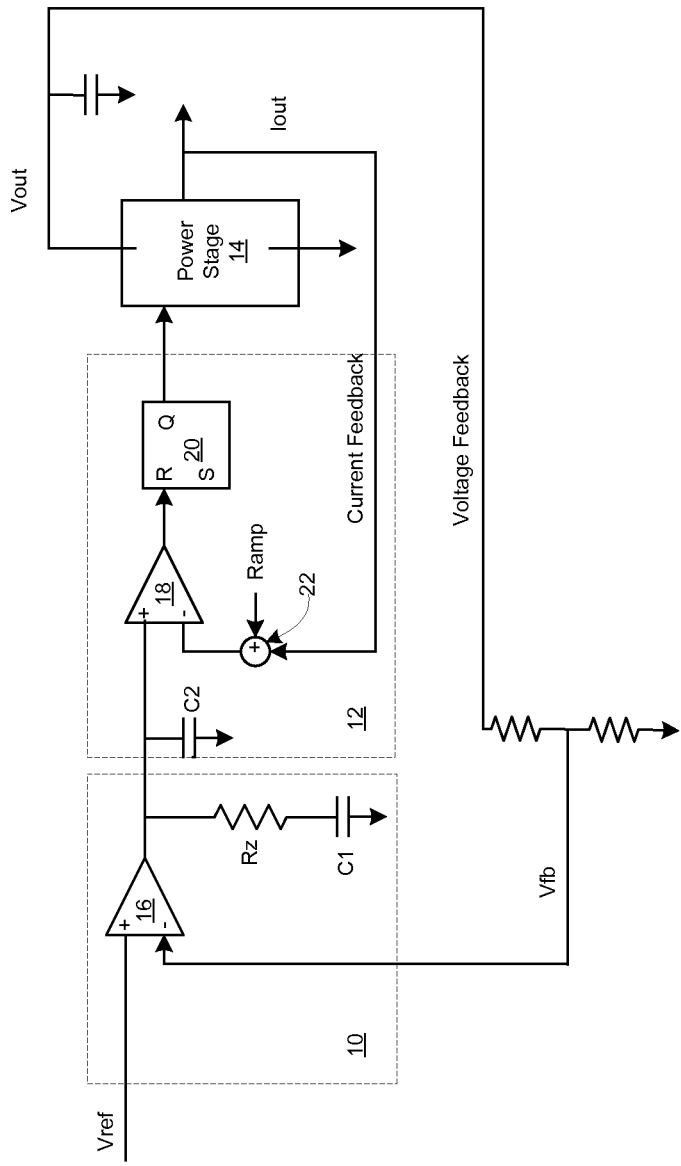
FIG. 1 illustrates a DC-to-DC converter with frequency compensation.

FIG. 1 illustrates a DC-to-DC converter that may include an error integrator circuit block 10, a modulation circuit block 12, and a power stage circuit block 14. The power stage circuit 14 may include a current output Iout that may provide a feedback to the modulation circuit block 12 in the form of a current feedback. The power stage circuit 14 may also include a voltage output Vout that may provide a scaled voltage feedback Vfb to the error integrator circuit block 10.

The error integrator 10 may include an amplifier 16 that compares the voltage feedback Vfb with a reference voltage Vref. A frequency compensator may be applied to the output of the amplifier 16. The error integrator 10 as shown in FIG. 1 utilizes a loop filter (or an RC circuit) that includes resistor Rz and capacitor C1 for frequency compensation. The output of the comparator 40 may be further filtered by a low-pass filter (capacitor C2).

The output of the error integrator 10 may be supplied to an input of the modulation circuit block 14. The modulation circuit block 14, as shown in FIG. 1, may include pulse width modulator (PWM) that may include an amplifier 18, a flip-flop 20, and an adder 22. The adder 22 may sum up the current feedback and a ramp signal, and provide the sum to the inverting input of the amplifier 18. The non-inverting input of the amplifier 18 may receive the output of the error integrator 10. The amplifier 18 may compare the signals at the inverting and non-inverting inputs and provide an output to the reset input (R) of the flip-flop 20. The set input (S) of the flip-flop 20 may receive a sequence of pulses, and the output of the flip-flop 20 is the PWM output that may be supplied to the power stage 14 which may generate a DC voltage output Vout (or an inversion of Vout) and an current output Iout.

FIG. 1 illustrates a DC-to-DC converter that includes frequency compensation. Without frequency compensation, the uncompensated converter has three poles within its bandwidth, which is difficult to stabilize. The current feedback as shown in FIG. 1 eliminates one pole response, thereby eliminating one pole from the frequency response. With the current feedback loop, the frequency response of the DC-to-DC converter may have two poles, including a lower frequency pole that comes from the outer voltage loop and a higher frequency pole that comes from the inner current loop. To further stabilize the second-order converter, a left-hand-plane (LHP) zero that is substantially close to the higher frequency pole may be introduced to counter the influence of the higher frequency pole.

One way to insert the zero is to use an RC circuit as shown in FIG. 1. The RC circuit includes a resistor Rz and a capacitor C1 that are serially connected between the output of the amplifier 16 and a ground reference. The RC circuit may generate a LHP zero in the frequency domain and stabilize the DC-to-DC converter. The transfer function of the error integrator circuit block as shown in FIG. 1 is $$F(s) = \frac{sR_z * C_1 + 1}{s*(s*R_z*C_2*C_1 + C_2 + C_1)}, \quad (1)$$

where $s = 2\pi f$, and f is the frequency. The frequency at which the LHP zero is placed may be $$f = \frac{1}{2\pi R_z C_1}, \quad (2)$$

and if C1>>C2, the pole is at $$f = \frac{1}{2\pi R_z C_1}. \quad (3)$$

Thus, the zero may be placed at an appropriate location on the frequency domain by adjusting either the resistance of resistor Rz or the capacitance of capacitor C1. For example, the zero may be placed near one of the poles to counter the influence of the pole.

In integrated circuit fabrication, large capacitors typically occupy much larger area compared to a large resistor since the occupied area of a capacitor is a function of the capacitance. Therefore, it may seem cost-effective to have a large resistance Rz and a small capacitor C1 for the RC circuit. However, maximizing Rz is limited by the allowable bandwidth of the converter. Therefore, very large Rz is not practical in reality. Accordingly, a large capacitor C1 is unavoidable for the RC circuit. In particular, in high power switching converters that have very low bandwidth due to large inductance and low switching frequencies, the capacitance C1 may need to be in the level of a few nF which may require too large an integrated area to be implemented on a limited silicon area in the form of an integrated capacitor. As a result, most high power switching converts use an external loop filter (or RC circuit) to achieve the desired capacitance C1. Unfortunately, an external loop filter increases the system cost and weakens the integrated circuit by subjecting the circuit to outside failures such as a short circuit.

Therefore, there is a need for reducing the reliance on a large capacitance that occupies significant silicon areas while preserving the stabilizing characteristics of the loop filter.

Embodiments may include a DC-to-DC converter. The DC-to-DC converter includes an error integrator that further includes a first amplifier and a second amplifier that each includes a first input for receiving a reference voltage and a second input for receiving a feedback voltage, a capacitor that is coupled to an output of the second amplifier, and a resistor including a first end being coupled to an output of the first amplifier and a second end being coupled to the capacitor.

Embodiments may include a DC-to-DC converter. The DC-to-DC converter may include an error integrator that further includes a first amplifier and a second amplifier that each includes a first input for receiving a reference voltage and a second input for receiving a feedback voltage, a resistor that is coupled to an output of the second amplifier, and a capacitor including a first end being coupled to an output of the first amplifier and a second end being coupled to the capacitor.

Embodiments may include an error integrator that includes a first signal path including a first amplifier and a second signal path including: a second amplifier whose transconductance (or the output current of the amplifier vs. the input voltage) is smaller than a transconductance of the first amplifier, a capacitor and a resistor.

Figure 2:
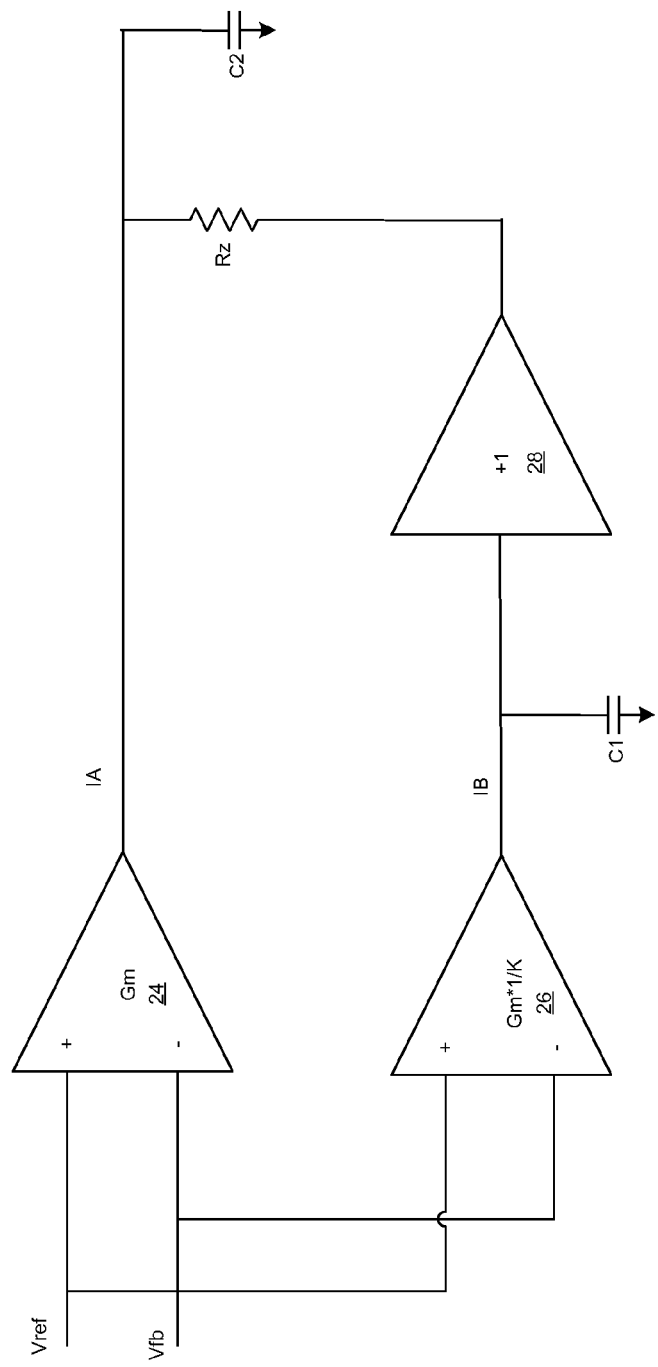
FIG. 2 illustrates an area-efficient error integrator with frequency compensation according to an embodiment.

FIG. 2 illustrates an area-efficient error integrator with frequency compensation according to an embodiment. The error integrator 22 as shown in FIG. 2 may substitute the area integrator 10 as shown in FIG. 1 to be part of the DC-to-DC converter. The error integrator 22 may generate one zero for stabilizing the DC-to-DC converter without the need for capacitors that are external to the integrated silicon. Thus, the error integrator 22 may be fabricated in a same process as other components and with reduced cost compared to ones that require an external loop filter.

The area-efficient error integrator 22 as shown in FIG. 2 may include a first amplifier 24 that has a transconductance Gm and a second amplifier 26 that has a transconductance Gm/K, where K is a ratio value. The area-efficient error integrator 22 may further include an isolation buffer 28, a capacitor C1 and a resistor Rz. Referring to the FIG. 2, amplifiers 24, 26 may each include a first input for receiving the reference voltage Vref and a second input for receiving the voltage feedback Vfb. The first and second inputs may be any one of a non-inverting or inverting input for the amplifiers. In an embodiment as shown in FIG. 2, the non-inverting input receives Vref while the inverting input receives Vfb. Amplifier 24 may convert the voltage difference Vref-Vfb into a current output IA. Similarly, amplifier 26 may convert the voltage difference Vref-Vfb into a current output IB. Because of the difference in the transconductance ratio, IA=K*IB. The current output IB of amplifier 26 may be couple to a capacitor C1 and through an isolation buffer 28 to a first end of resistor Rz. In an embodiment, the isolation buffer 28 may be a unit-transconductance amplifier. A second end of resistor Rz may be coupled to the current output IA of amplifier 24 and another capacitor C2. The output of amplifier 24 may be connected to an output terminal of the error integrator 22 to provide a current signal to the input of the following PMW circuit block.

The transfer function of the area-efficient error integrator 22 as shown in FIG. 2 may be:

$$F(s) = \frac{s*K*R_z*C_1 + 1}{s*(s*K*R_z*C_2*C_1 + K*C_1)}, \quad (4)$$

where K is the ratio of trans-conductance of amplifier 24 over that of amplifier 26. The error integrator 22 may be considered to include a loop filter that includes amplifier 26, capacitor C1, isolation buffer 28, and resistor Rz whose zero is located at $$f = \frac{1}{2\pi K R_z C_1}. \quad (5)$$

It is noted that while the zero is shifted, the pole of Equation (4) is still at essentially the same location as that of Equation (3). Thus, for the new loop filter, the capacitance C1 is effectively multiplied by K times even though the physical capacitance remains the same. Therefore, a large capacitance for the loop filter may be achieved without the need for the physical presence of a large capacitor or an external capacitor.

The ratio K may determine the effective capacitance for the loop filter as shown in FIG. 2. In one embodiment, K may be in a range from 4 to 16. In another embodiment, K may be in a range from 8 to 12. In one embodiment, the ratio K is chosen to be 8, and the simulation results show that the overall frequency response is almost identical to that of an RC circuit using a capacitor that has eight-time capacitance. However, the embodiment as shown in FIG. 2 may save silicon area that would have been needed by a large capacitor or the need for an external capacitor.

Figure 3:
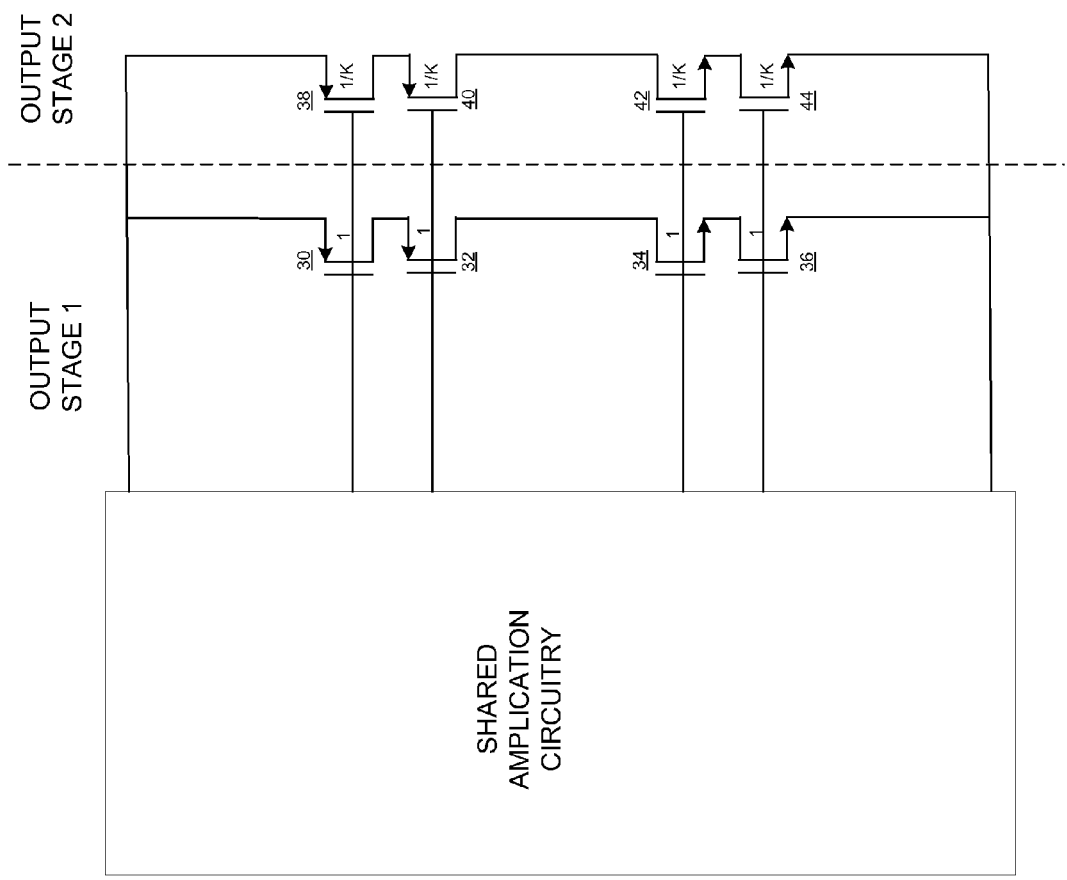
FIG. 3 illustrates a circuit of the area-efficient error integrator according to an embodiment.

In an embodiment, amplifiers 24, 26 may be implemented on the silicon independently in the form of two separate amplifiers. In an alternative embodiment, amplifiers 24, 26 may share part of the amplification circuit that has different output stages for the current outputs. FIG. 3 illustrates a circuit of the area-efficient error integrator according to an embodiment. As shown in FIG. 3, amplifiers 24, 26 may share a common amplification circuit that may include differential amplification circuitries. Further, the amplification circuit may include a first output stage that may include MOS transistors 30, 32, 34, 36, and a second output stage that may include MOS transistors 38, 40, 42, 44, in which transistors 30, 32, 34, 36 may have the same unit transconductance, and transistors 38, 40, 42, 44 have the same 1/K gain. Thus, the current output from the first stage is IA, and the current output from the second stage is IB=IA/K. In this way, amplifiers 24, 26 may be implemented using shared circuitry. The size of the silicon may be further reduced.

Figure 4:
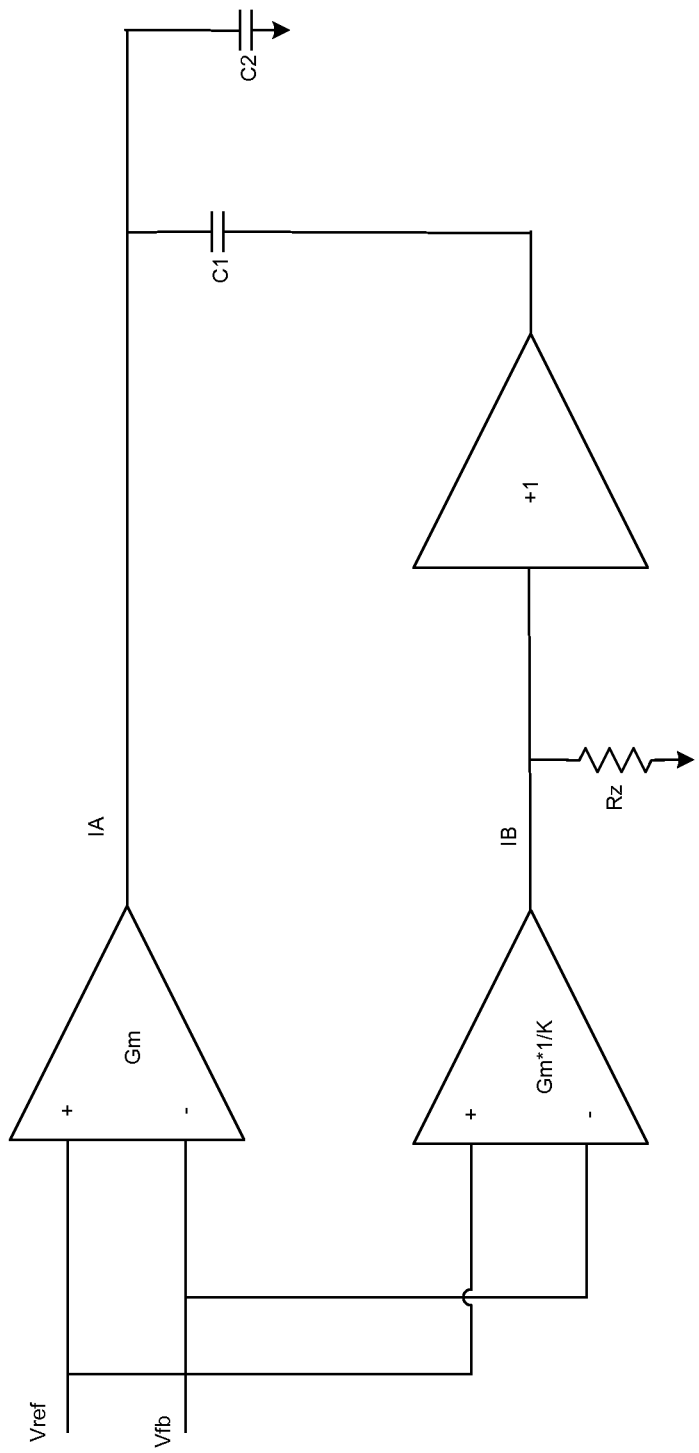
FIG. 4 illustrates an area-efficient error integrator with frequency compensation according to another embodiment.

FIG. 2 illustrates one embodiment of the area-efficient error integrator. Alternatively, FIG. 4 illustrates an area-efficient error integrator with frequency compensation according to another embodiment. Compared to FIG. 2, the embodiment as shown in FIG. 4 swaps the positions of C1 and Rz. The transfer function of the error integrator as shown in FIG. 4 is the same as FIG. 2.

Those skilled in the art may appreciate from the foregoing description that the present invention may be implemented in a variety of forms, and that the various embodiments may be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and following claims.

What is claimed is:

1. A DC-to-DC converter, comprising:
  an error integrator including:
    a first transconductance amplifier and a second transconductance amplifier that each includes a first input for receiving a reference voltage and a second input for receiving a feedback voltage and each generating a corresponding current output;
    a capacitor coupled to an output of the second amplifier;
    a resistor including a first end being coupled to an output of the first amplifier; and
    an isolation buffer coupled to a second end of the resistor and coupled to the capacitor to scale the output of the second transconductance amplifier.

2. The DC-to-DC converter of claim 1, further comprising:
  a pulse-width modulator (PWM) for receiving an output from the error integrator, and
  a power stage circuit for receiving an output from the PWM, the power stage circuit including a current output for providing a current feedback to the PWM and a voltage output for providing a voltage feedback to the error integrator.

3. The DC-to-DC converter of claim 1, wherein a transconductance ratio of the first amplifier is different from a transconductance ratio of the second amplifier.

4. The DC-to-DC converter of claim 3, wherein a transconductance ratio of the first amplifier is greater than a transconductance ratio of the second amplifier.

5. The DC-to-DC converter of claim 4, wherein the transconductance ratio of the first amplifier is K times the transconductance ratio of the second amplifier, wherein K is a number in the range of 4 to 16.

6. The DC-to-DC converter of claim 1, wherein the capacitor is an integrated capacitor that is fabricated along with the first and second amplifiers in a same process.

7. The DC-to-DC converter of claim 1, wherein the first and the second amplifiers share a common circuit, and wherein the first amplifier includes a first output stage, and the second amplifier includes a second output stage.

8. The DC-to-DC converter of claim 7, wherein the first output stage includes at least one MOSFET transistor whose gain is K times a gain of at least one MOSFET transistor of the second output stage.

9. A DC-to-DC converter, comprising:
  an error integrator including:
    a first transconductance amplifier and a second transconductance amplifier that each includes a first input for receiving a reference voltage and a second input for receiving a feedback voltage and each generating a corresponding current output;
    a resistor coupled to an output of the second amplifier;
    a capacitor including a first end being coupled to an output of the first amplifier; and
    an isolation buffer coupled to a second end of the capacitor and coupled to the resistor to scale the output of the second transconductance amplifier.

10. The DC-to-DC converter of claim 9, further comprising:
  a pulse-width modulator (PWM) for receiving an output from the error integrator, and
  a power stage circuit for receiving an output from the PWM, the power stage circuit including a current output for providing a current feedback to the PWM and a voltage output for providing a voltage feedback to the error integrator.

11. The DC-to-DC converter of claim 10, wherein the capacitor is an integrated capacitor that is fabricated along with the first and second amplifiers in a same process.

12. The DC-to-DC converter of claim 10, wherein a transconductance ratio of the first amplifier is greater than a transconductance ratio of the second amplifier.

13. The DC-to-DC converter of claim 12, wherein the transconductance ratio of the first amplifier is K times the transconductance ratio of the second amplifier, wherein K is a number in the range of 4 to 16.

14. An error integrator, comprising:
  a first signal path including a first transconductance amplifier; and
  a second signal path including:
    a second transconductance amplifier whose transconductance is less than a transconductance of the first amplifier;
    a capacitor;
    a resistor; and
    an isolator situated between the capacitor and the resistor to scale an output of the second transconductance amplifier.

15. The error integrator of claim 14, wherein the capacitor is an integrated capacitor that is fabricated along with the first and second amplifiers in a same process.

16. The error integrator of claim 14, wherein the transconductance of the first amplifier is K times the transconductance of the second amplifier, wherein K is a number in the range of 4 to 16.

17. The error integrator of claim 16, wherein an output of the second amplifier is coupled to the resistor, the isolator is coupled between the resistor and the capacitor, and the capacitor is coupled to an output of the first amplifier.

18. The error integrator of claim 16, wherein an output of the second amplifier is coupled to the capacitor, the isolator is coupled between the capacitor and the resistor, and the resistor is coupled to an output of the first amplifier.

* * * * *